(12) United States Patent
Hansler et al.

(10) Patent No.: US 6,272,267 B1
(45) Date of Patent: Aug. 7, 2001

(54) OPTICAL COUPLER AND SYSTEM FOR DISTRIBUTING LIGHT IN A 360-DEGREE PATTERN

(75) Inventors: Richard L. Hansler, Pepper Pike; Thomas E. Stenger, Mt. Vernon, both of OH (US)

(73) Assignee: Fiberstars Incorporated, Fremont, CA (US)

( * ) Notice: Subject to any disclaimer, the term of this patent is extended or adjusted under 35 U.S.C. 154(b) by 0 days.

(21) Appl. No.: 09/226,066

(22) Filed: Jan. 6, 1999

Related U.S. Application Data

(60) Provisional application No. 60/072,168, filed on Jan. 6, 1998.

(51) Int. Cl.[7] .................................................... G02B 6/00

(52) U.S. Cl. ............................................. 385/43; 385/146

(58) Field of Search ................................ 385/43, 146, 34

(56) References Cited

U.S. PATENT DOCUMENTS

| | | | |
|---|---|---|---|
| 4,946,239 | * 8/1990 | Garmon | 350/96.31 |
| 5,152,598 | * 10/1992 | Schaffer | 362/32 |
| 6,058,232 | * 5/2000 | Lee et al. | 385/39 |

OTHER PUBLICATIONS (Anonymous), "High Definition Lighting from Farlight," Commercial brochure published by the Farlight Company of Torrance, California more than one year prior to Jan. 6, 1999, the filing date of the subject application.

(Anonymous), "SVL–312 Series Light–Emitting Diode (LED)," Data Book—Opto Devices, published by Rohm (a Japanese corporation) ('97–'98), p. 95.

(Anonymous), "High Definition Lighting from Farlight," Commercial brochure published by the Farlight Company of Torrance, California more than one year prior to Jan. 6, 1999, the filing date of the subject application. (In Public Domain More Than One Year Prior of the Filing Date of the Application).

(Anonymous), "GL5 47 Series Light–Emitting Diode (LED)," Published by Sharp Company on their website: http://ns3.sharp.co.jp/ecg/led/lamp/lamp.html. (In Public Domain More Than One Year Prior of the Filing Date of the Application).

(Anonymous), "Picture of GL5 47 Series Light–Emitting Diode (LED)," Published by Sharp Company on their website: http://ns3.sharp.co.jp/ecg/led/lamp/lampl.html. (In Public Domain More Than One Year Prior the Filing Date of the Application).

(Anonymous), "SVL–312 Series Light–Emitting Diode (LED)," Data Book—Opto Devices, published by Rohm (a Japanese corporation) ('97–'98), p. 95.

(Anonymous), photographs of a prior art optical device sold by General Electric Company, 3 pages. (In Public Domain More Than One Yeat Prior the Filing Date of the Application).

* cited by examiner

*Primary Examiner*—Hung N. Ngo
(74) *Attorney, Agent, or Firm*—Charles E. Bruzga

(57) ABSTRACT

An optical coupler for distributing light in a 360-degree pattern at a small angle is disclosed. The coupler comprises a solid rod with a first end region for receiving light and a second end region for distributing light. The rod tapers up in cross-sectional dimension between the first and second regions so as to decrease the angular distribution of light reflecting internally from the sides of tapered portions of the rod. An axis extends from the second end region towards the first end region. The second end region includes a generally conically shaped void pointing towards the first end region and defining a surface for deflecting light in a 360-degree pattern about the axis at a small angle compared to light entering into the first end region.

11 Claims, 2 Drawing Sheets

OPTICAL COUPLER AND SYSTEM FOR DISTRIBUTING LIGHT IN A 360-DEGREE PATTERN

This application claims priority from provisional application Ser. No. 60/072,168, filed on Jan. 6, 1998.

FIELD OF THE INVENTION

The present invention relates to an optical coupler and system for distributing light in a 360-degree pattern, and more particularly to such a coupler and system for distributing light in the mentioned pattern at a small angle above and below a plane.

BACKGROUND OF THE INVENTION

Boats and other water-going vessels are often required to display a light on the highest part of the vessel. Because the highest point is usually the top of a mast which may support sails or radio antenna, for instance, it may be difficult to replace a failed lamp in that location. It, therefore, would be desirable to employ a lamp located at the base of the mast, where it is easily reached, and to direct the light to the top of the mast with a fiber-optic, or light, guide. However, the problem arises of how to distribute the light reaching the upper end of the light guide to meet a required beam pattern. The required pattern for at least one class of ships is to provide 94 candela for 360 degrees in a horizontal plane and which extends 7½ degrees above and 7½ degrees below the horizontal plane.

SUMMARY OF THE INVENTION

An exemplary embodiment of the invention comprises an optical coupler for distributing light in a 360-degree pattern at a small angle. The coupler includes a solid rod with a first end region for receiving light and a second end region for distributing light. The rod tapers up in cross-sectional dimension between the first and second regions so as to decrease the angular distribution of light reflecting internally from the sides of tapered portions of the rod. An axis extends from the second end region towards the first end region. The second end region includes a generally conically shaped void pointing towards the first end region and defining a surface for deflecting light in a 360-degree pattern about the axis at a small angle compared to light entering into the first end region.

The foregoing embodiment provides an output device for distributing light in the required pattern which minimizes light loss and is simple to manufacture and compact.

DETAILED DESCRIPTION OF THE INVENTION

Figure 1:
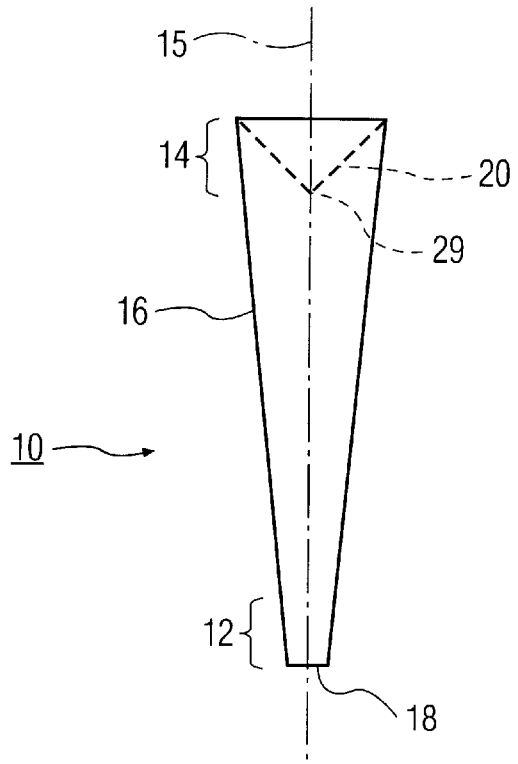
FIG. 1 is a side view of an optical coupler in accordance with the invention.
Figure 2:
FIG. 2 is a plan view of a light input port of the coupler of FIG. 1.
Figure 3:
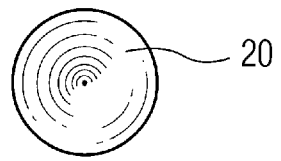
FIG. 3 is a plan view of a light output port of the coupler of FIG. 1.

A preferred embodiment for distributing light from the end of a light guide (not shown) in the required pattern is illustrated in FIGS. 1–3. FIG. 1 shows an optical coupler 10 with an input end region 12 and an output end region 14, each preferably centered about a longitudinal axis 15. Side wall 16 of coupler 10 may taper from input region 12 to output region 14, and, if desired, may also taper in regions 12 and 14. The tapers are preferably uniform. An input light port 18, shown also in FIG. 2, receives light from a light guide (not shown) and passes it into the body of coupler 10. An output port 20, preferably conically shaped, also shown in FIG. 3, is used for distributing light in a desired pattern.

Figure 4:
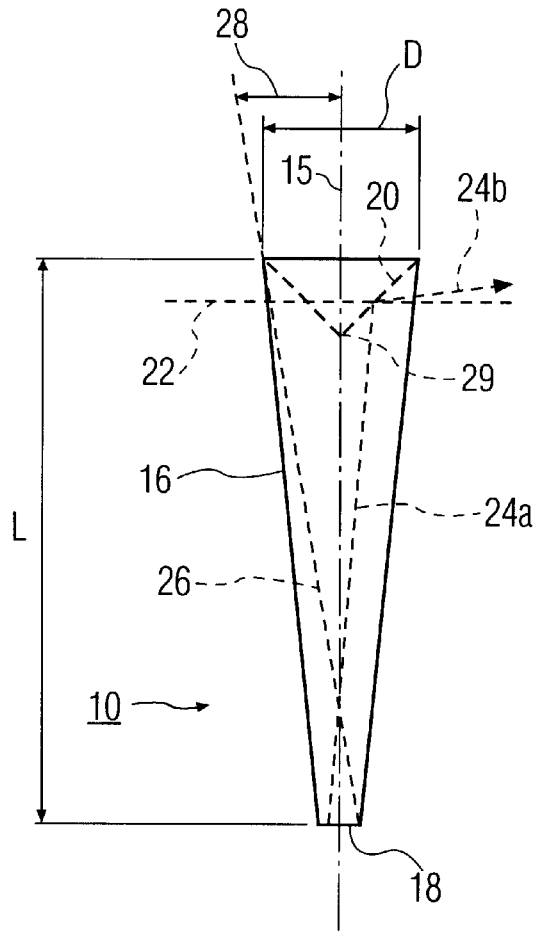
FIG. 4 is a side view of the coupler of FIG. 1 showing the paths of various light rays and various dimensions.

FIG. 4 shows a further side view of coupler 10, illustrating various light rays with respect to axis 15 and a plane 22 orthogonal to the axis and representing a horizontal plane when the coupler is attached to the mast of a boat or other vessel, for instance. "Horizontal" and other orientations mentioned herein are merely exemplary. A light ray 24a received through port 18 totally internally reflects from angled surface 20 to propagate as light ray 24b. As FIG. 4 illustrates, light ray 24b is oriented at only a small angle with respect to plane 22, e.g., 7½ degrees above or 7½ degrees below plane 22, or a resulting angle of 15 degrees. "Small" angle refers herein to angles generally less than approximately 40 degrees, and preferably less than approximately 20 degrees. Totally internally reflected light rays such as ray 24b provide the desired distribution of light.

Light ray 26 illustrates the maximum angle 28 of light that is not reflected from wall 16 of the coupler, the light entering a peripheral portion of input light port 18 and exiting a peripheral portion of output port 20. Angle 28 may be 7½ degrees, for instance. In contrast, light received through input port 18 typically has an angular spread of 30 to 40 degrees half angle. In this connection, the taper of coupler wall 16 results in an angle-to-area conversion for reducing the angle of light received from the input port. Where an especially large angle-to-area conversion is desired, the taper may define a compound parabolic reflector made in accordance with non-imaging optics, a technology known per se in the art. Preferably, a substantial axial length, or the full axial length, of coupler wall 16 is tapered in output region 14 from the axial center 29 of output port 20 to the top of coupler 10. This causes such axial length of the coupler to function both as an area-to-angle coupler and as a means of directing light (e.g., ray 24b) into a desired pattern.

Figure 5:
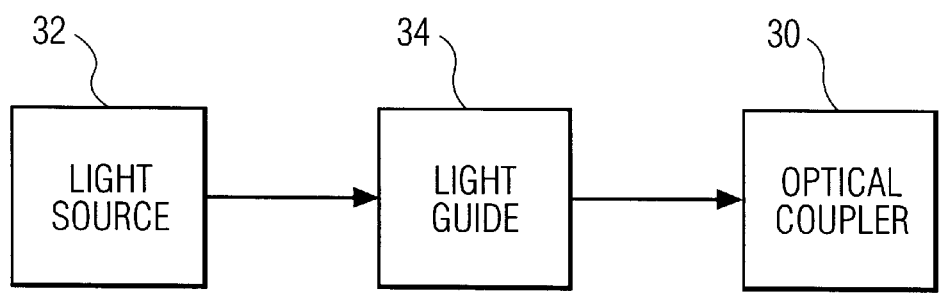
FIG. 5 is a block diagram of a complete light system incorporating a coupler such as shown in FIG. 1.

FIG. 5 shows a light system incorporating a coupler 30, which may be as shown, for instance, in FIG. 1. A light source 32 may typically comprise a small source placed in an elliptical reflector so as to image the source onto the input end (not shown) of a light guide 34, such as a ½-inch diameter large core plastic optical fiber (LCPOF). A preferred light source is an XMH60P1 source made by GE Lighting of Cleveland, Ohio. It can introduce more than 2000 lumens into a ½-inch diameter LCPOF. An SEL500LCPOF produced by Lumenyte International Corporation of Irvine, Calif. transmits light with an efficiency of more than 0.985 per foot, so a typical mast of 25 height will transmit more than 0.685 of the incident light. With light provided to the light guide of 2000 lumens, light output from the light guide will therefore be 1370 lumens for 25 feet of light guide. If optical coupler 30 reduces the angular spread of light from 30–40 degrees to 7½ degrees in the vertical direction, the 1370 lumens are available to produce a desired light pattern. The total solid angle in a light beam 15 degrees wide and covering all 360 degrees is 1.64 steradian. If there are no other losses, the available flux is 1370/1.64 lumens per steradian or 836 candela, which is well in excess of the required 94 candela.

Referring again to FIG. 1, the tapering of coupler wall 16 reduces the angle of the light entering input port 18. The input port is preferably just slightly larger in cross-sectional dimension than the core of light guide 34 (FIG. 5), or slightly more than ½-inch in diameter for the mentioned LCPOF. An appropriate size for the output end of the taper can be determined from the known angle-to-area relationship wherein the mathematical product of the area of an emitter (or output) and the solid angle of the emitted light, and the same factors for a receiver (or input), are the same. In the mentioned example, the area of input end times the solid angle corresponding to 40 degrees plane angle equals the area of output times the solid angle corresponding to a 7½ degree plane angle. Diameter D (FIG. 4) of the output end of coupler 10 can be expressed by equation 1 as follows:

$$[pi(0.25)^2]/4 \times 2pi(1-\cos 30) = [pi(D)^2]/4 \times 2pi(1-\cos 7½) \quad (\text{eq. 1})$$

Solving equation 1 for D shows that D =1.97 inches.

In determining the length L of coupler 10 (FIG. 4), it is preferred that the marginal rays such as ray 26 (FIG. 4) which do not reflect from surface 16 not lie at more than 7½ degrees from the axis. FIG. 4 shows this to occur where length L of coupler 10 is at least 8½ inches.

Referring again to light ray 24b in FIG. 4 that is oriented in a desired pattern, conically shaped output port 20 changes the direction of ray 24a due to total internal reflection at this surface of the output port. This is because the angle of incidence for almost all of the rays reaching the output port exceeds the critical angle expressed by sine (critical angle) equals 1/n, where n, the index of refraction, for acrylic is about 1.49. If coupler wall 16 tapers over its entire length, the angle at which the output port is cut should not be exactly 45 degrees (half angle) because refraction at outer wall 16 shifts the light rays slightly upwards. To compensate for this effect, the cone angle of the output port may be increased to about 47½ degrees. Alternatively, the upper part of coupler wall 16 in the vicinity of output end region 14 can be made cylindrical so no refraction will occur for the axial rays. In this case, the cone may be oriented at 45 degrees from the axis.

In a working example of the embodiment of FIG. 1, a prototype tapered rod with a conical void in the larger end was fashioned from acrylic, with input port 18 of ½-inch diameter, output port 20 of 2-inch diameter, and a length L (FIG. 4) of 8½ inches. While machining of the acrylic was employed, molding would be more economical for large scale production. A 45-foot length of SEL500 large core plastic optical fiber from Lumenyte International and an XMH60P1 lamp from GE Lighting were employed. Output light was measured 20 feet from the tapered rod, indicating an intensity of 560 candela, or 1.4 foot-candles (lumens per square foot) at 20 feet. Since candela equals foot candles times distance squared, the mentioned 560 candela results from 1.4 times $(20)^2$. The width of the output beam of light at 20 feet was approximately 6 feet. The tan (half angle) equals 3/20. The half angle equals 8.5 degrees, or more than required.

The dimensions in the foregoing design example are linearly scalable. Thus, if a fiber-optic cable of ¼-inch diameter is used rather than the ½-inch diameter cable mentioned above, the other mentioned dimensions are also halved.

While the invention has been described with respect to specific embodiments by way of illustration, many modifications and changes will occur to those skilled in the art. For instance, while the foregoing refers to a Xenon metal halide light source and a LCPOF, an incandescent illuminator directing light into glass fibers, for example, can be used instead to provide a suitable light pattern where the optical coupler is appropriately dimensioned. It is, therefore, to be understood that the appended claims are intended to cover all such modifications and changes as fall within the true scope and spirit of the invention.

What is claimed is:

1. An optical coupler for distributing light in a 360-degree pattern at a small angle, comprising:
    a) a solid rod with a first end region for receiving light and a second end region for distributing light; said rod tapering up in cross-sectional dimension between said first and second regions so as to decrease the angular distribution of light reflecting internally from the sides of tapered portions of said rod;
    b) an axis extending from said second end region towards said first end region; and
    c) said second end region including a generally conically shaped void pointing towards said first end region and defining a surface for deflecting a substantial amount of light in a 360-degree pattern about said axis at a small angle compared to light entering into said first end region.

2. The optical coupler of claim 1, wherein:
    a) said void extends from a first point along said axis to a second point along said axis; and
    b) a substantial extent of said rod between said first and second points is tapered in a manner for decreasing the angular distribution of light reflecting internally therefrom.

3. The optical coupler of claim 2, wherein:
    a) substantially the full length of said rod between said first and second points is tapered in a manner for decreasing the angular distribution of light reflecting internally therefrom; and
    b) the angle of said conically shaped void is selected to achieve a distribution of light at less than about 20 degrees from a plane orthogonal to said axis.

4. The optical coupler of claim 1, wherein said rod has a substantially straight taper from said first end region to said first point.

5. The optical coupler of claim 1, wherein said rod is tapered to achieve at least approximately a four-fold reduction in angular distribution of distributed light compared to received light.

6. The optical coupler of claim 1, wherein said void is substantially cone shaped.

7. In combination with the optical coupler of claim 1, a light source and a light guide for directing light from said source to said input light port of said coupler.

8. An optical coupler for distributing light in a 360-degree pattern at a small angle, comprising:
    a) a solid rod with a first end region for receiving light and a second end region for distributing light;
    b) an axis extending from said second end region towards said first end region;
    c) said second end region including a substantially conically shaped void pointing towards said first end region and defining a surface for deflecting a substantial amount of light in a 360-degree pattern about said axis at a small angle from a plane orthogonal to said axis compared to light entering into said first end region; and
    d) said rod increasing in cross-sectional dimension between said first and second regions, with a substantially straight taper, so as to decrease the angular distribution of light reflecting internally from the sides of tapered portions of said rod.

9. The optical coupler of claim 8, wherein:
a) said void extends from a first point along said axis to a second point along said axis more distant from said first end region than said first point;
b) substantially the entire length of said rod between said first end region and said second point is tapered in a manner for decreasing the angular distribution of light reflecting internally therefrom; and
c) the angle of said conically shaped void is selected to achieve a distribution of light at less than about 20 degrees from a plane orthogonal to said axis.

10. The optical coupler of claim 8, wherein said rod is tapered to achieve at least approximately a four-fold reduction in angular distribution of distributed light compared to received light.

11. In combination with the optical coupler of claim 8, a light source and a light guide for directing light from said source to said input light port of said coupler.

* * * * *